United States Patent [19]

Correa et al.

[11] Patent Number: 5,253,474
[45] Date of Patent: Oct. 19, 1993

[54] APPARATUS FOR SUPERSONIC COMBUSTION IN A RESTRICTED LENGTH

[75] Inventors: Sanjay M. Correa; Richard E. Warren, Jr., both of Schenectady, N.Y.

[73] Assignee: General Electric Company, Schenectady, N.Y.

[21] Appl. No.: 753,139

[22] Filed: Aug. 30, 1991

[51] Int. Cl.⁵ .............................. F02K 7/08
[52] U.S. Cl. ..................... 60/270.1; 60/740
[58] Field of Search ............... 60/270.1, 740, 204

[56] References Cited

U.S. PATENT DOCUMENTS

| | | | |
|---|---|---|---|
| 3,074,668 | 1/1963 | Frenzl | 60/270.1 |
| 3,667,233 | 6/1972 | Curran et al. | 60/270.1 |
| 3,864,907 | 2/1975 | Curran | 60/270.1 |
| 4,494,625 | 1/1985 | Mathes | 60/270.1 |
| 5,072,582 | 12/1991 | Harshman | 60/270.1 |

OTHER PUBLICATIONS

S. M. Correa et al., "Supersonic Sudden-Expansion Flow with Fluid Injection: an Experimental and Computational Study," Paper AIAA 89-389, 1989.

Primary Examiner—Richard A. Bertsch
Assistant Examiner—Michael I. Kocharov
Attorney, Agent, or Firm—Patrick R. Scanlon; Paul R. Webb, II

[57] ABSTRACT

A supersonic combustion ramjet having a supersonic combustor. The supersonic combustor has a backward-facing step formed in a wall thereof and a forward-facing ramp formed in the wall downstream from the step. Hydrogen fuel is injected into the air flow by axially-directed fuel injectors disposed in the step and/or normally-directed fuel injectors disposed in the ramp. The ramp is inclined toward the center of the combustor so that fuel from the fuel injectors is turned into the main flow. The ensures rapid mixing which enables combustion to be completed within a distance on the order of one foot.

12 Claims, 2 Drawing Sheets

APPARATUS FOR SUPERSONIC COMBUSTION IN A RESTRICTED LENGTH

BACKGROUND OF THE INVENTION

This invention relates generally to an apparatus for supersonic combustion and more particularly concerns a supersonic combustor for a supersonic combustion ramjet (scramjet) engine.

A ramjet engine is a relatively simple jet-propulsion device in which impinging air is compressed by the forward speed of the aircraft as it enters the engine. Fuel is injected into the compressed air stream and combusted to produce thrust. In a supersonic combustion ramjet, or scramjet, the combustion is carried out in a supersonic air stream. Hydrogen is typically the fuel used with scramjets. The chief advantages of these devices are their simplicity and low weight. A conventional scramjet is shown in cross section in FIG. 1. The device generally comprises three sections: a compression zone 1 where impinging supersonic air (represented by arrow A) enters through an inlet 2 and is compressed, a combustor 3 where the compressed air and fuel injected through a fuel injector 4 are mixed and burned, and an exhaust nozzle 5 where the products of the combustion in the combustor 3 are exhausted to produce forward thrust.

Conventional supersonic aircraft currently operate up to about Mach 3. Their engines are typically turbojets or turbofans in which the air flow through the combustor is slowed to subsonic speeds. This would result in excessively high temperatures for hypersonic flight. Thus, there has been considerable interest in developing a scramjet engine to be used in the propulsion of hypersonic aircraft, i.e., aircraft capable of reaching speeds in the range of Mach 5 to Mach 25. However, for scramjet propulsion to be feasible from an engineering point of view, combustion must be complete within distances on the order of one foot. Thus, the fuel injection must be accomplished in a manner that results in mixing and burning the fuel as rapidly as possible.

The range of conditions confronting aeropropulsion combustors will widen dramatically with the advent of high altitude scramjet engines. For example, while gas-turbine engines might be expected to operate from sea level to about 30 kilometers, corresponding to combustor pressures of 40 atm. to 1-2 atm., scramjet engines envisioned for transatmospheric vehicles will operate at altitudes in excess of 60 kilometers, where ambient pressures are well below 0.1% of atmospheric. Ram compression through inlet/forebody systems of the compression zone can increase the combustor static pressure but only at the expense of mounting aerodynamic losses and heat load on the vehicle. Cooling limitations therefore place an upper bound on the attainable pressures. The concern with low static pressures is that the rate of combustion reactions is lower at lower pressures. Furthermore, the time for combustion is very short in scramjets due to the supersonic flow through the combustor. Even as flight speed drops, the axial velocity through the engine is not significantly reduced. Thus, the "residence time" in a scramjet combustor is typically less than $1 \times 10^{-4}$ seconds. The small time duration and slow reaction rate pose obstacles to developing a scramjet combustor which can meet the engineering requirement of completing mixing and combustion within a distance on the order of one foot.

Various scramjet combustors have been previously proposed. One such device is shown in FIG. 1. The fuel injector 4 is situated near the inlet of the combustor 3 and is arranged to provide normal injection of the fuel into the supersonic air flow. As used herein, the term "normal" means perpendicular to the air flow, and the term "axial" means parallel to the air flow. Normal injection is generally beneficial because the injected jet of fuel, being transverse to the air flow, is well-mixed with the compressed air and thus burns more efficiently. However, the normal injection of FIG. 1 has the problem that the pressure rise from the combustion, which occurs forward of the jet, is transmitted upstream of the jet through a subsonic wall boundary layer to the inlet of the combustor. This coupling of the inlet flow and the combustion process creates an aerodynamic disturbance to the inlet flow which will prevent supersonic air flow from continuing into the combustor.

The combustor 3a of a second conventional scramjet is shown in FIG. 2. In this device, the fuel injector 4a provides normal injection of fuel into the supersonic air flow upstream of a backward-facing step 6a formed in a wall of the combustor 3a. This arrangement results in a flame held on the step 6a, downstream of the combustor inlet. However, the injected jet of fuel tends to interact with the inlet, leading to the same coupling problem described above with respect to the device of FIG. 1.

FIG. 3 shows another conventional approach. The fuel injector 4b is arranged in a wall of the combustor 3b so as to produce axial injection of fuel. Axial injection is advantageous in that the fuel has momentum in the axial direction which is added to the overall thrust of the engine. At the high speeds at which scramjets are operated, the structure of the aircraft is greatly heated by friction with the atmosphere. The fuel is typically used to cool the heated structure so the fuel is very hot (approximately 1200°K) upon injection into the compressed air stream. The hot fuel represents a significant source of thrust when injected axially, particularly through a converging or converging-diverging nozzle. The drawback is that axial injection leads to very poor mixing because the fuel and air both flow in the same direction.

In FIG. 4, a strut 7c is disposed in the combustor 3c. The strut 7c has a number of fuel injectors 4c pointing downstream for axial injection. This arrangement is able to take advantage of the increased thrust due to the momentum of the axially injected fuel while achieving good mixing because the fuel is injected in a distributed manner across the air flow. The problem with the strut arrangement is that the strut 7c tends to become very hot and considerable effort must be expended in cooling the strut. Also, aerodynamic losses due to blockage by the strut 7c of the supersonic air flow are significant and decrease overall thrust.

Another previous arrangement is shown in FIG. 5. A fuel injector 4d injects fuel downstream of a backward-facing step 6d formed in a wall of the combustor 3d. The fuel injection can be normal (as shown) or axial (not shown). This arrangement isolates the inlet to the combustor 3d from the combustion process by interrupting the boundary layer, thereby avoiding the problem of coupling between the inlet flow and the combustion process present in the arrangements of FIGS. 1 and 2. However, computational and experimental studies (see Correa, S. M. and Warren, R. E. "Supersonic Sudden-Expansion Flow with Fluid Injection: an Experimental and Computational Study," Paper AIAA 89-389, 1989) have shown that with this arrangement the flow behind the step 6d does not penetrate into the main flow, thus limiting mixing. This increases the combustor length needed to achieve adequate mixing.

Thus, there remains a need for a supersonic scramjet combustor capable of completing mixing and combustion within a distance on the order of one foot while using axial and/or normal fuel injection.

SUMMARY OF THE INVENTION

The need referred to above and other objects are accomplished in the present invention by providing a supersonic combustor for use in a scramjet in which at least one wall of the combustor cavity has a backward-facing step formed therein. A forward-facing ramp is formed in the same wall immediately downstream from the step. The ramp is inclined toward the center of the combustion cavity. The device is equipped with a fuel injector located in the step for providing axial fuel injection and/or a fuel injector located in the ramp for providing normal fuel injection.

Other objects and advantages of the present invention will become apparent upon reading the following detailed description and the appended claims and upon reference to the accompanying drawings.

DESCRIPTION OF THE DRAWINGS

The subject matter which is regarded as the invention is particularly pointed out and distinctly claimed in the concluding portion of the specification. The invention, however, may be best understood by reference to the following description taken in conjunction with the accompanying drawing figures in which:

DETAILED DESCRIPTION OF THE INVENTION

Figure 1:
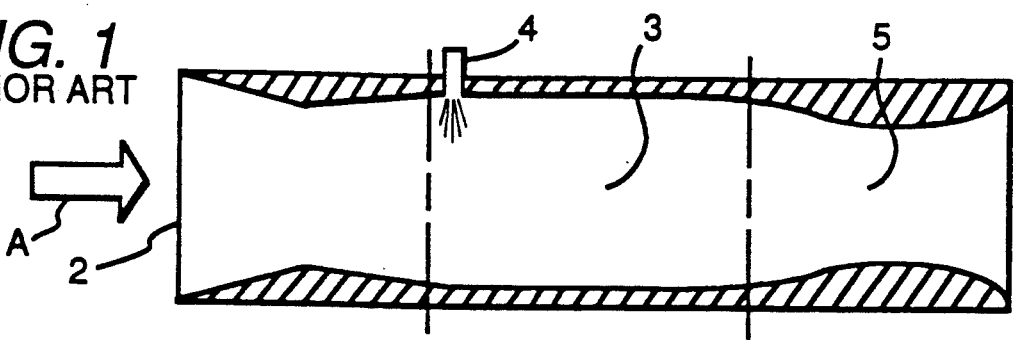
FIG. 1 is a side view in cross section of a conventional scramjet having normal fuel injection.
Figure 2:
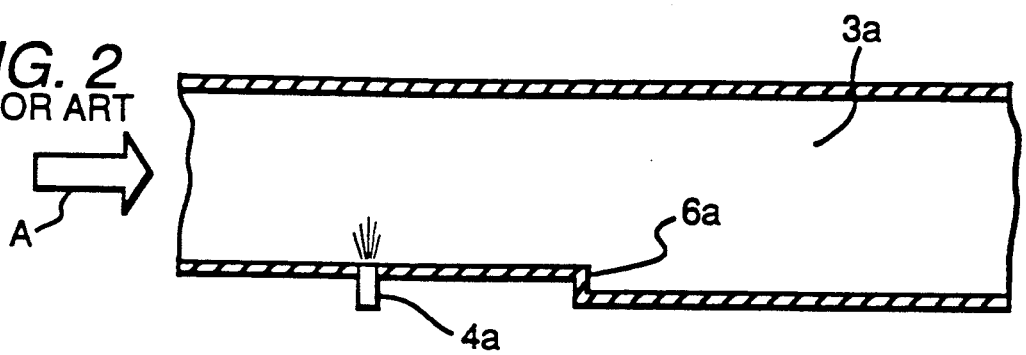
FIG. 2 is a side view in cross section of the combustor of another conventional scramjet having normal fuel injection upstream of a backward-facing step.
Figure 3:
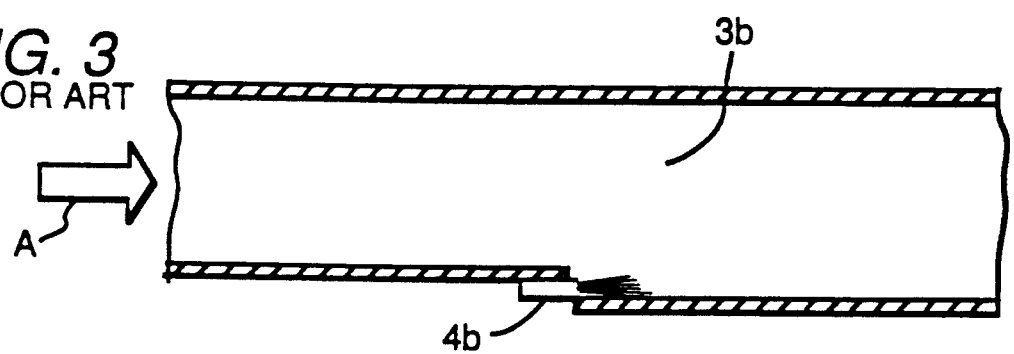
FIG. 3 is a side view in cross section of the combustor of another conventional scramjet having axial fuel injection.
Figure 4:
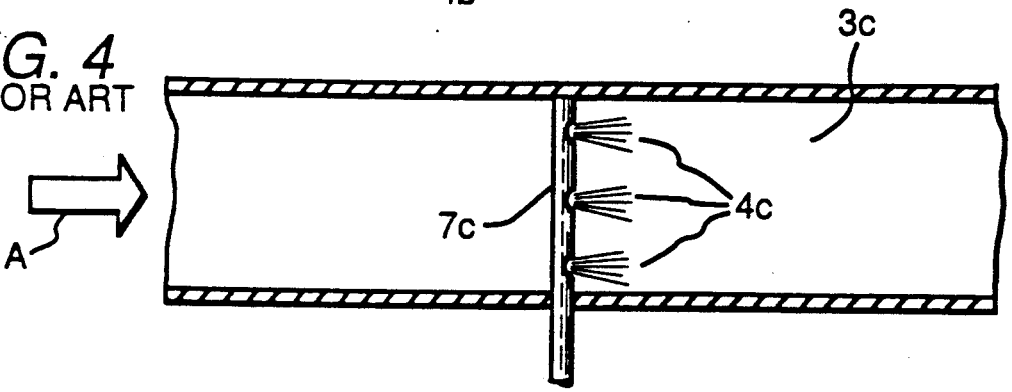
FIG. 4 is a side view in cross section of the combustor of another conventional scramjet having a transverse strut providing axial fuel injection.
Figure 5:
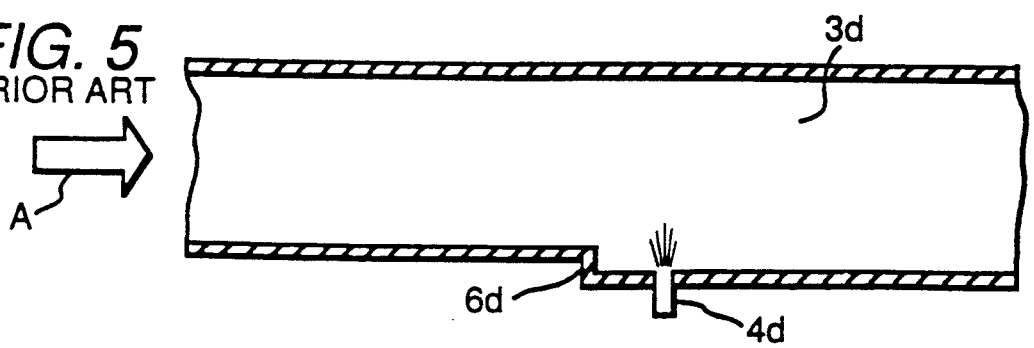
FIG. 5 is a side view in cross section of the combustor of another conventional scramjet having normal fuel injection downstream of a backward-facing step.
Figure 6:
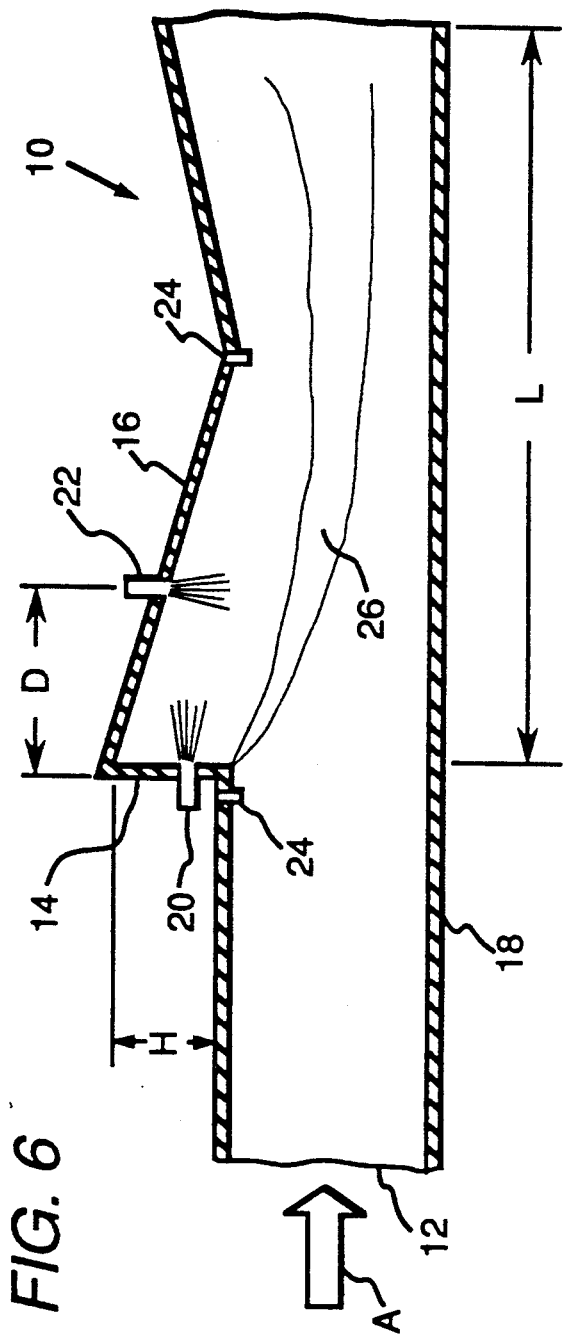
FIG. 6 is a side view in cross section of the combustor of the present invention.

Turning to FIG. 6, the scramjet combustor 10 of the present invention is shown. The combustor 10 defines a closed combustion cavity in which fuel and compressed air are mixed together and burned. Compressed, supersonic air (represented by the arrow A) from the compression zone of the scramjet enters the combustor 10 through an inlet 12. The inlet 12 is essentially the plane of transition from the compression zone (not shown in the drawing) to the combustor 10. A backward-facing step 14 is formed in the upper wall of the combustor 10, downstream from the inlet 12. Downstream from the step 14 is a converging wall or forward-facing ramp 16.

The ramp 16 begins at the base of the step 14 so that the two configurations are contiguous. The ramp is formed so that it inclines towards the center of the combustion cavity; that is the ramp 16 and the opposing combustor wall 18 define a converging or narrowing space. Although the step 14 and ramp 16 are shown as being formed in the upper wall of the combustor 10, they could just as easily be formed in another wall of the combustor, such as the lower wall 18.

Fuel injection is accomplished axially, normally or axially and normally simultaneously. For axial injection, one or more axial fuel injectors 20 are located in the backward-facing face of the step 14. Preferably, a row of fuel injectors 20 spanning the width of the combustor are employed. The fuel injectors 20 are disposed so that the jets of fuel emitted therefrom are directed in the axial direction. For normal injection, one or more normal fuel injectors 22 are located in the ramp 16 and arranged so that the jets of fuel are emitted in a direction that is perpendicular to the air flow. As with the axial fuel injectors 20, the normal fuel injectors 22 are preferably provided in a row spanning the width of the combustor. The fuel injectors 22 are located a distance, D, downstream from the base of the step 14 which is approximately equal to one to two times the height, H, of the step 14. Igniters 24 for inducing combustion are located just upstream of the step 14 and at the downstream end of the ramp 16.

The effect of the ramp 16 converging into the combustion cavity is that the flow behind the step, which includes the fuel, will be turned into the main air flow. This ensures adequate penetration of the fuel into the air flow. The mixing and combustion zone 26 is thus displaced into the main air flow promoting rapid mixing so that combustion is completed within a distance L which, in a practical device, is on the order of one foot or less. The backward-facing step 14 prevents coupling between the inlet flow and the combustion process, thus avoiding the loss of supersonic flow. The optimal angle of incline and depth of penetration for the ramp 16 depends on the particular flight cruise conditions the scramjet is intended to undergo. An important question is whether the combustion cavity can converge to the point where the passage is narrower than the passage through the combustor inlet without impairing the overall cycle. If this becomes a problem, the step 14 can be moved upstream into the latter part of the inlet so that the minimum cross-sectional area imposed by the ramp 16 equals the cross-sectional area of the original combustor inlet.

Figure 7:
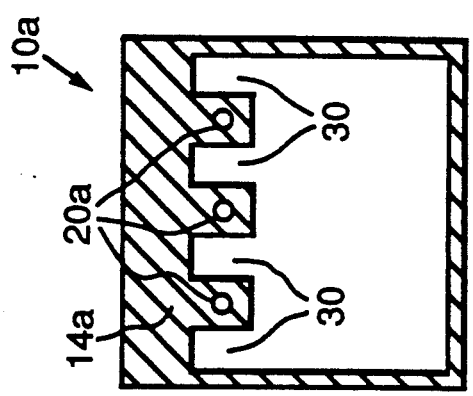
FIG. 7 is an end view in cross section of another embodiment of the present invention.

A second embodiment of the present invention having a feature which further promotes mixing is shown in FIG. 7. FIG. 7 shows an end view of a combustor 10a taken in section at the backward-facing step 14a. The combustor 10a is essentially identical to the combustor 10 of FIG. 6 except for the addition of a series of spanwise channels 30. As seen in the Figure, the series of channels 30 are formed on the backward-facing step 14a, facing the combustion cavity. The channels 30 extend across the width of the combustor 10a and are located between the axial fuel injectors 20a. The placement of the channels 30 between the fuel injectors 20a allows air to expand between the fuel jets, thereby increasing the shear mixing.

The foregoing has described a supersonic scramjet combustor having axial and/or normal fuel injection which rapidly mixes fuel with the supersonic air flow in order to complete combustion within a distance on the order of one foot or less. While the combustor of the present invention is shown as being rectangular in cross section about its longitudinal axis, other configurations are possible. For instance, the combustor could be cylindrical. For a cylindrical shape, the step and ramp formations would be formed along a partial arc on the inner surface of the cylindrical wall.

While specific embodiments of the present invention have been described, it will be apparent to those skilled in the art that various modifications thereto can be made without departing from the spirit and scope of the invention as defined in the appended claims.

What is claimed is:

1. A supersonic combustor comprising:
    a combustion cavity defined by at least one wall, said cavity having a front inlet and a rear outlet so that air flows from front to rear;
    a backward-facing step formed in said at least one wall of said cavity;
    a forward-facing ramp formed in said at least one wall downstream from said step, said ramp being inclined toward the center of said cavity;
    at least one axial fuel injector disposed in said step; and
    at least one normal fuel injector disposed in said ramp.

2. The supersonic combustor of claim 1 wherein said step and said ramp are contiguous.

3. The supersonic combustor of claim 1 further comprising at least one other axial fuel injector disposed in said step.

4. The supersonic combustor of claim 3 further comprising at least one channel formed in said step and located between said axial fuel injectors.

5. The supersonic combustor of claim 1 wherein said at least one normal fuel injector is located a distance downstream from said step which is approximately equal to one to two times the height of said step.

6. The supersonic combustor of claim 1 further comprising at least one other normal fuel injector disposed in said ramp.

7. The supersonic combustor of claim 6 wherein said normal fuel injectors are located a distance downstream from said step which is approximately equal to one to two times the height of said step.

8. The supersonic combustor of claim 1 wherein said combustion cavity has a length of no more than approximately one foot.

9. A supersonic combustion ramjet engine comprising:
    a compression zone having an inlet for admitting impinging air and an outlet for emitting compressed air;
    a supersonic combustor attached to said outlet of said compression zone, said supersonic combustor having a combustion cavity defined by at least one wall, said cavity having a front inlet and a rear outlet so that air flows from front to rear, a backward-facing step formed in said at least one wall of said cavity, and a forward-facing ramp formed in said at least one wall downstream from said step, said ramp being inclined toward the center of said cavity;
    at least one axial fuel injector disposed in said step;
    at least one normal fuel injector disposed in said ramp; and
    an exhaust nozzle attached to said outlet of said supersonic combustor.

10. The supersonic combustion ramjet engine of claim 9 further comprising at least one other axial fuel injector disposed in said step.

11. The supersonic combustion ramjet engine of claim 9 further comprising at least one other normal fuel injector disposed in said ramp.

12. The supersonic combustion ramjet engine of claim 1 wherein said combustion cavity has a length of no more than approximately one foot.

* * * * *